US007029340B2

(12) United States Patent
Smith

(10) Patent No.: US 7,029,340 B2
(45) Date of Patent: Apr. 18, 2006

(54) REGENERATIVE SURFING

(76) Inventor: Timothy D Smith, 3515 Launcelot Way, Annandale, VA (US) 22003

( * ) Notice: Subject to any disclaimer, the term of this patent is extended or adjusted under 35 U.S.C. 154(b) by 0 days.

(21) Appl. No.: 10/971,114

(22) Filed: Oct. 25, 2004

(65) Prior Publication Data
US 2005/0109258 A1    May 26, 2005

Related U.S. Application Data

(60) Provisional application No. 60/513,567, filed on Oct. 24, 2003.

(51) Int. Cl.
*B63H 19/02*    (2006.01)

(52) U.S. Cl. ........................................................ 440/9

(58) Field of Classification Search .................. 440/9
See application file for complete search history.

(56) References Cited

U.S. PATENT DOCUMENTS

| | | | | |
|---|---|---|---|---|
| 2,048,339 A | * | 7/1936 | Kalfas ............................ | 440/9 |
| 5,398,628 A | * | 3/1995 | Rethorst ........................ | 114/62 |
| 5,582,123 A | * | 12/1996 | Rethorst ........................ | 114/62 |
| 6,058,872 A | * | 5/2000 | Latorre .......................... | 114/272 |
| 6,105,527 A | * | 8/2000 | Lochtefeld et al. ........... | 114/125 |

* cited by examiner

*Primary Examiner*—Stephen Avila
(74) *Attorney, Agent, or Firm*—Young & Thompson

(57) ABSTRACT

Regenerative surfing is utilizing a controllable regenerative braking system to regulate speed while surfing. A vertical sculling hydrofoil boat, utilizes the regenerative braking system and includes a vertical sculling drive system for both propulsion and regenerative braking. The regenerative surfing boat also may include ballast tanks to tune the speed at which the maximum lift to drag ratio appears. The regenerative surfing boat may use an automated surfing control system to control the boat. A method of controlling the trajectory of a surfing boat by controlling a regenerative braking device utilizes a hydrodynamic power collection device for trajectory control as an energy harvesting method.

18 Claims, 5 Drawing Sheets

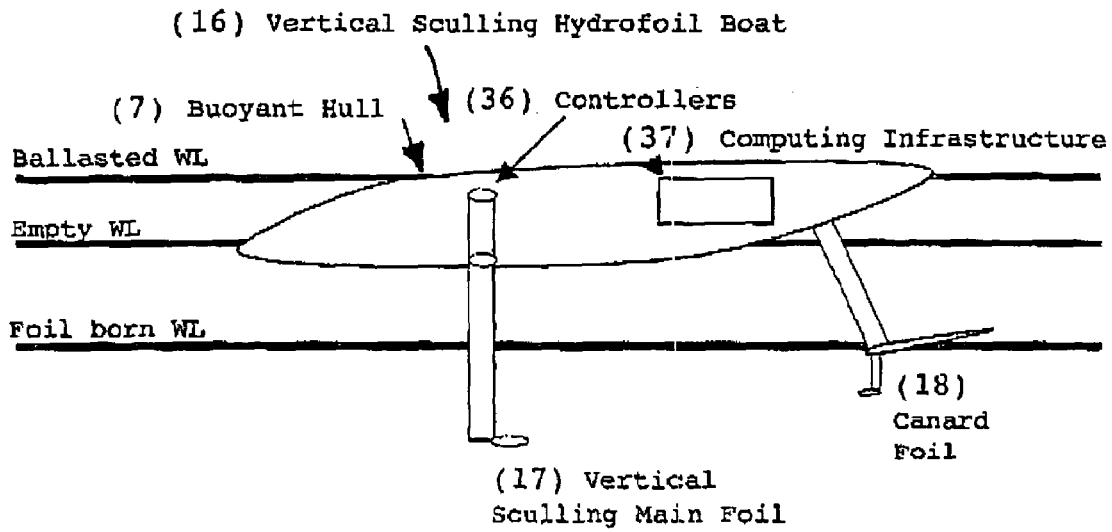
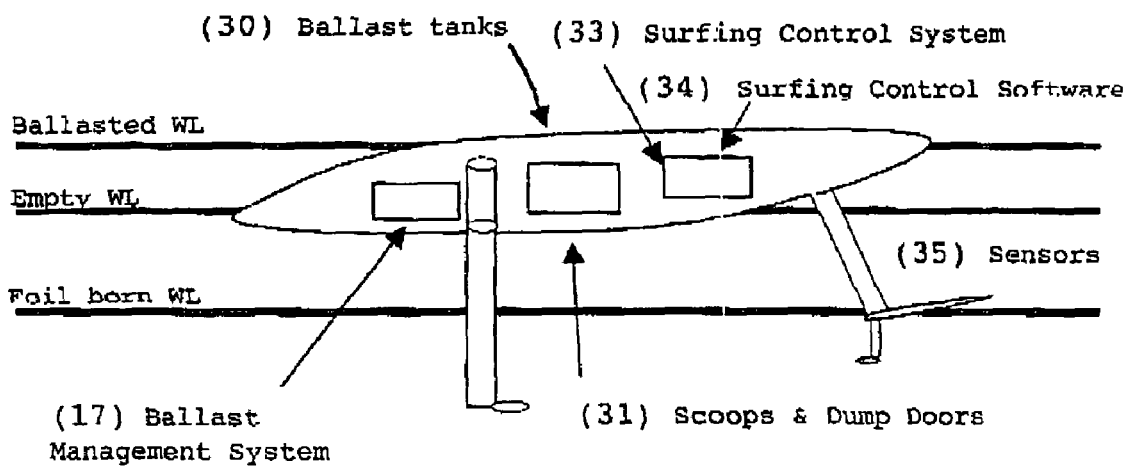
Figure 2: Vertical Sculling Hydrofoil Boat

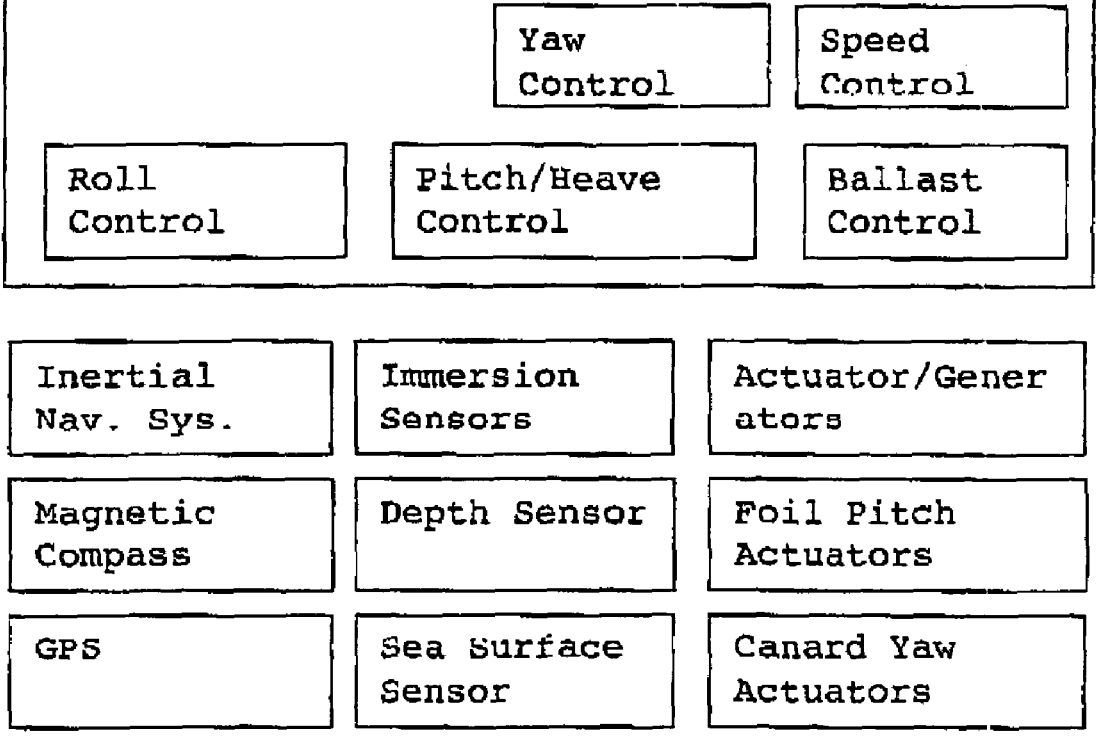
Figure 3: Regenerative surfing control system schematic.

Figure 4
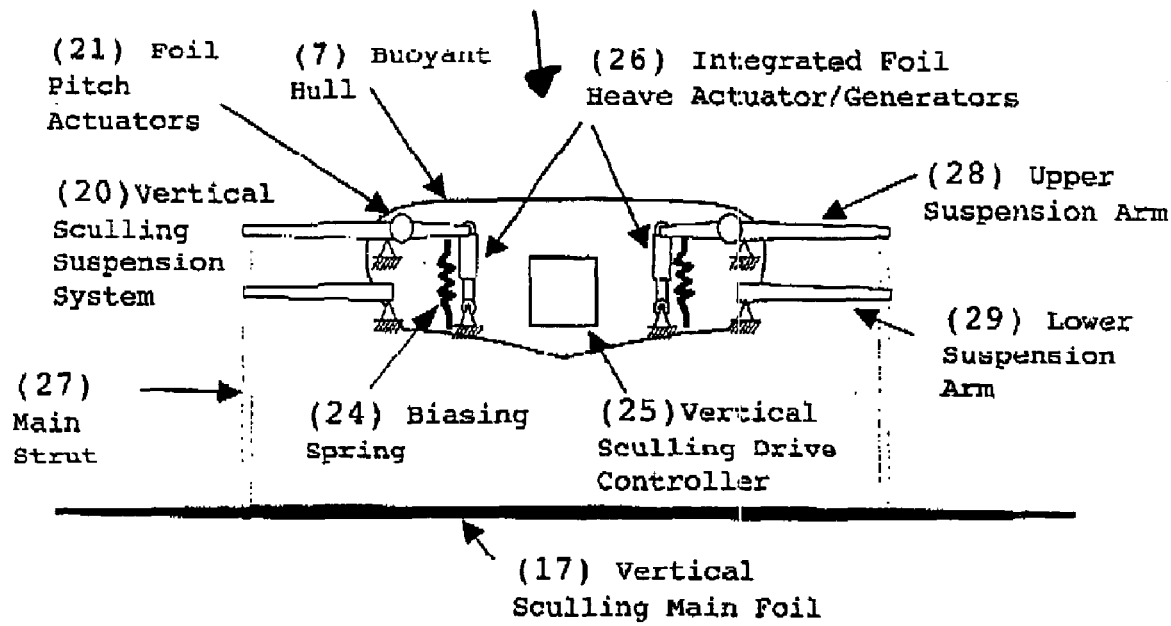
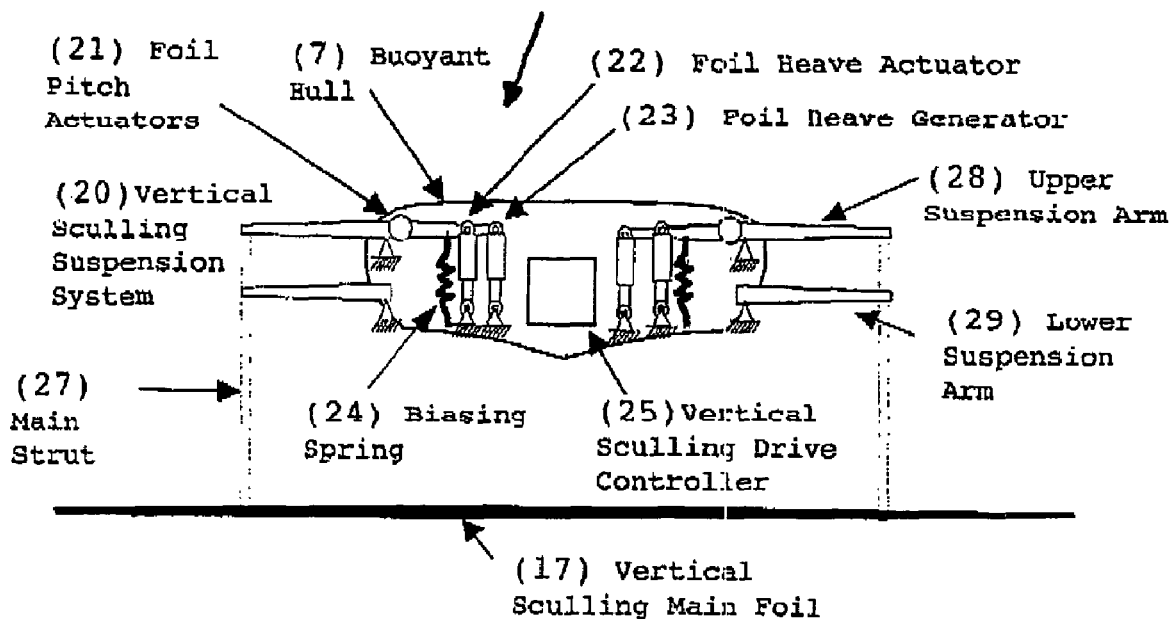
Figure 5: Cross section of vertical sculling Drive System

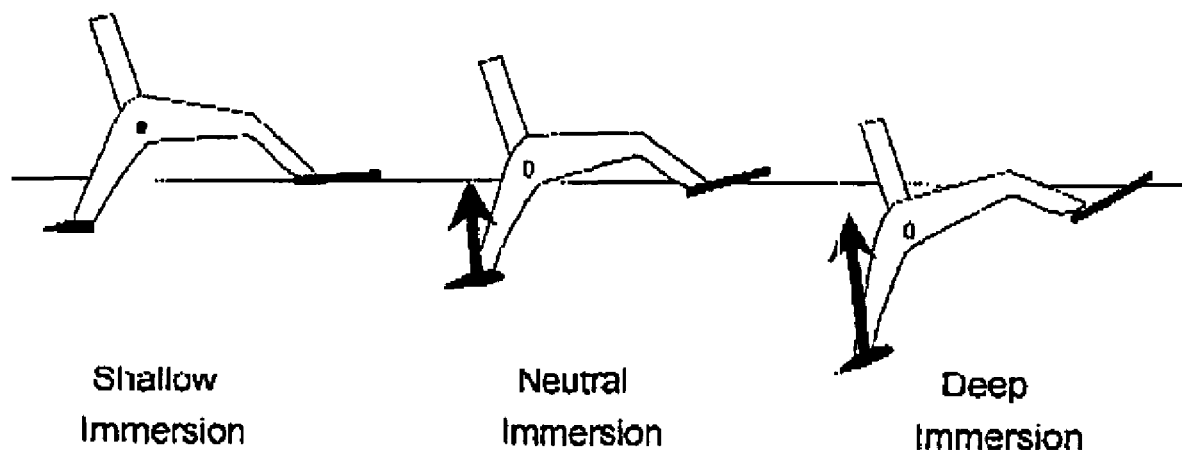
Figure 6: Canard Foil/Ski detail

REGENERATIVE SURFING

SUMMARY OF THE INVENTION

This patent application describes a method by which boats can harvest power from water waves by regenerative surfing, and a regenerative surfing boat that uses a controllable regenerative braking system to generate braking control forces and harvest power while surfing.

Boats surf when they traveling with a wave on its face. Surfing boats experience a reduction or elimination of propulsion requirements because the force of gravity tugs the boat down the sloped face of the wave. When this tug of gravity, equal to the sine of the local wave slope times the weight of the boat, is equal to the drag of the boat then the boat is surfing in equilibrium. When the drag of a surfing boat is smaller than the tug of gravity there is an opportunity for the boat to harvest power by regenerative braking. This phenomena, henceforth called regenerative surfing, is the basis of this patent application.

In general, surfing is not a stable activity. Small applications of thrust, drag and turning forces are required to maintain position, direction and speed on the face of the wave. Boats that are surfing effect speed control by a variety of means; by dragging oars, paddles, sea anchors or warps; by changing sail trim; by modifying the fore-and-aft mass distribution and therefore the trim of the boat; or in the case of powered craft, by modulating the throttle. Board surfers turn and edge their craft to traverse the face of the wave at a high speed to maintain a steady rate of advance in the direction of the wave.

This patent presents a novel method of controlling the trajectory of a surfing boat by controlling a regenerative braking device. There are several examples of marine boats that harvest power from moving water with hydrodynamic power generation devices, however they do not use these devices as trajectory control devices. Medium and large sailing yachts sometimes trail water propellers connected to electric power generators to recharge their batteries. Some sailing yachts allow their auxiliary propellers to act as water turbines to power electric generators. These applications of regenerative braking at sea are passive and are not utilized as speed regulation devices. It is believed that utilizing a hydrodynamic power collection device for trajectory control is unique and a new method of energy harvesting.

Regenerative surfing, or utilizing a controllable regenerative braking system to regulate speed while surfing, is claimed as unique and a new art. A novel vertical sculling hydrofoil boat, utilizing a vertical sculling drive system for both propulsion and regenerative braking, ballast tanks to tune the speed at which the maximum lift to drag ratio appears, and an automated surfing control system, is one embodiment for a regenerative surfing boat.

BRIEF DESCRIPTION OF THE DRAWINGS

FIG. 2 shows an embodiment of a vertical sculling hydrofoil boat;

FIG. 3 shows an embodiment of a regenerative surfing control system schematic;

FIG. 4 shows an embodiment of a vertical sculling drive system for the vertical sculling hydrofoil of FIG. 3;

FIG. 5 shows another embodiment of a vertical sculling drive system for the vertical sculling hydrofoil of FIG. 3; and FIG. 6 shows an embodiment of a canard foil.

DETAILED DESCRIPTION OF THE PREFERRED EMBODIMENTS

Figure 1:
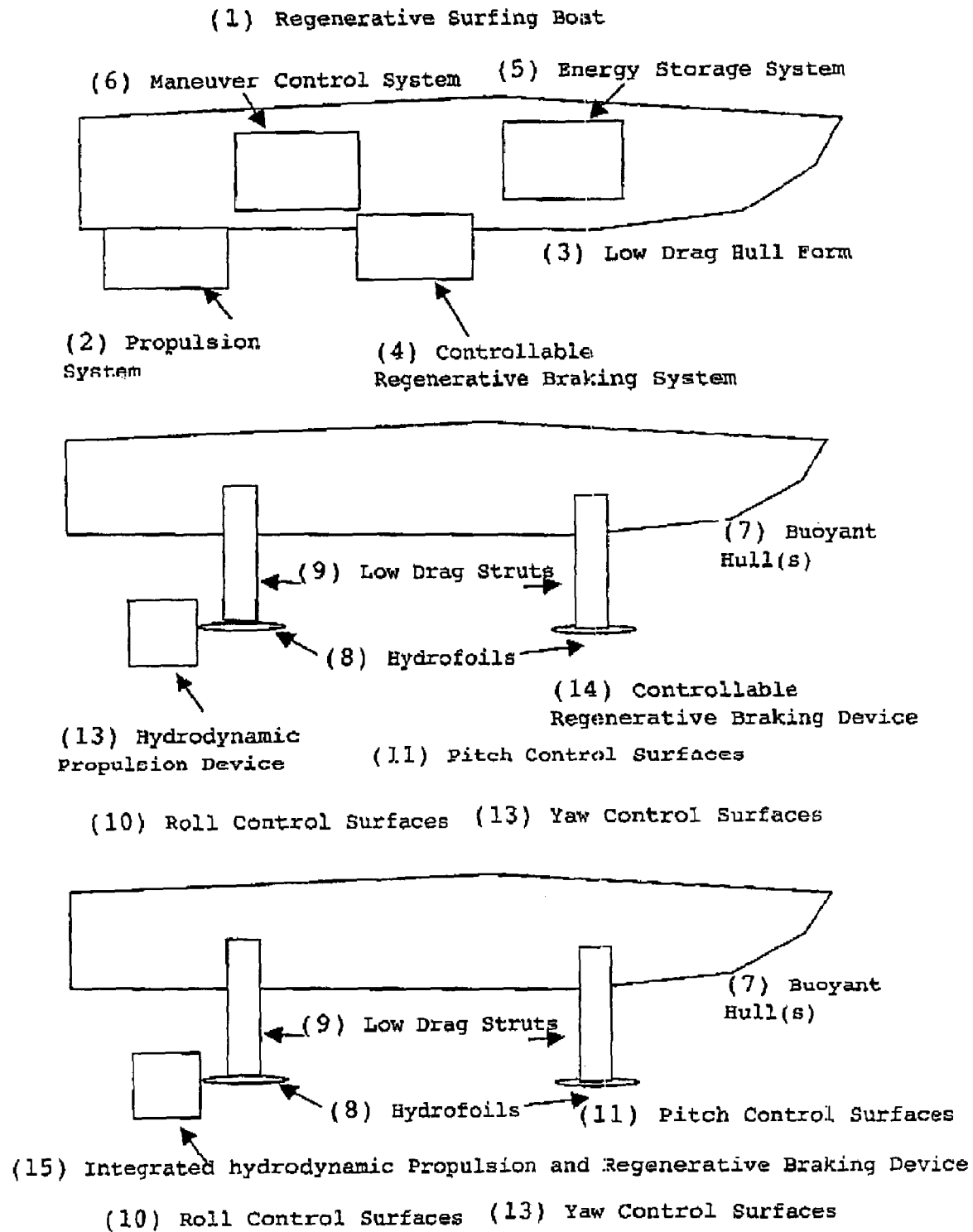
FIG. 1 shows an embodiment of a regenerative surfing boat.

Regenerative surfing requires a combination of extreme agility, high efficiency and intelligence to generate a net positive power on typical wind-generated open water waves. These requirements imply the following four functional elements:

1. As seen in FIG. 1, a low drag hull form (3), especially at surfing speeds The allowable braking force that can be applied while surfing is equal to difference between the force of gravity tugging the boat down the faces of the wave and the drag of the boat as it slides down the face of the wave. The power collection while braking to collect power is proportional to this force times the speed of the water moving past the boat. Reducing drag allows more of the gravitational pull to act against the regenerative braking system (4), and therefore results in greater power collection. Reduced drag also makes it easier for the regenerative surfing boat (1) to catch waves, and prolongs the duration of the surfing phases, so it is important for a practical regenerative surfing boat to have a hull form with low drag at surfing speeds (3).

Analysis of standard wave spectra show that typical steep wave faces on the open ocean have face slopes that range from five to ten degrees. Equilibrium surfing on a five degree wave slope requires a hull form with a lift to drag ratio of 11, which is quite good for an ordinary marine vehicle. However, a L/D ratio of 11 is not good enough for practical regenerative surfing.

Modeling and analysis of a regenerative surfing boat following near-optimal trajectories in typical sea spectra show that L/D ratios of 20 or more are require before the net power collected (net power is the energy harvested minus energy overhead expending during the capture, transit and dismount phases of regenerative surfing) is greater than zero. Further, these extremely high lift to drag ratios must be exist at surfing speeds, which ranging from 10 to 25 knots in typical ocean conditions.

It is virtually impossible to achieve these performance figures with a conventional hull form. Hydrofoils (8) are generally constructed that may achieve the above performance figures. A vertical sculling hydrofoil boat (16) described with respect to FIG. 3, meets this performance criterion by utilizing a high aspect ratio main hydrofoil (17) and a small canard foil (18) to lift the buoyant hull (7) out of the water at high speeds to reduce drag, and by utilizing a vertical sculling drive system (19) to oscillate the main foil (17) for both propulsion and braking, and thereby eliminate the appendage drag of separate hydrodynamic propulsion (13) and controllable hydrodynamic regenerative braking (14) devices.

2. A controllable regenerative braking system (4)

This system may be part of the craft's propulsion system (2) or it may be separate. Since high drag while catching a wave is counterproductive, the device must offer minimum drag while not producing power. The hydrodynamic regenerative braking system must be controllable, since surfing on unsteady natural waves requires frequent modulation of the drag. The other criteria for the device is that it must extract power from moving water.

The hydrodynamic regenerative braking device may be a rotating hydrodynamic surface (e.g., a propeller, impeller or water turbine); an oscillating hydrodynamic surface (e.g. a flapping fin or sculling oar); a drag-producing device (e.g., a paddle wheel, parachute or roughened conveyer belt); a hydrodynamic scoop; a resonant cavity; or a magneto-hydrodynamic generator.

The vertical sculling drive system (19) described with respect to FIG. 4 is highly efficient at extracting power from hydrodynamic flows, produces large drag forces when required and low drag forces when idle, and is easy to modulate with the foil pitch actuators (21).

3. An energy storage system (5)

Because surfing power may be only available intermittently, the energy collected must be stored for future use. The storage system may be magnetic, electrical, chemical or mechanical. The energy storage system may include batteries, capacitors, inductors, flywheels, pressure tanks, springs, or chemical conversions (e.g., electrolysis of water into hydrogen and oxygen).

The energy storage system must be capable of absorbing bursts of energy while surfing, and releasing bursts of energy to make the high thrust required for catching waves. In general, the peak power input or output levels will be several times the steady state power output for propulsion at the average speed of advance.

The hybrid battery/capacitor system described below satisfies these criteria.

4. An automated surfing control system (33)

The maneuvering control system (6) of the regenerative surfing boat (1) may be automated, semi-automated or manual. Manual control offers advantages in wave selection, as human sight and intelligence are difficult to match with current automation technology.

Real-world water waves change shape and speed rapidly, so an automated surfing control system (33) is almost a necessity for regenerative surfing. The surfing control system provides real-time turning, braking and acceleration guidance in order to position the regenerative surfing boat (1) properly on the steepest, fastest parts of the wave. Failure to execute a near optimal trajectory while surfing dramatically reduces the net power collection.

The automated surfing control system (33) senses and predicts both the motion of the boat and the local wave environment; uses these predictions to select a promising trajectory for regenerative surfing; calculates near-optimal guidance inputs to thrust, steer and brake the regenerative surfing boat onto the trajectory; and continuously monitors and corrects as the actual surfing trajectory unfolds.

The surfing control system operates a variety controllers (36) that send signals to the actuators. These actuators vary with the construction of the regenerative surfing craft; however at a minimum they must provide sufficient control in yaw, thrust and braking for the regenerative surfing control system to guide the boat on the trajectory. Since trajectory control is so important for regenerative surfing, most regenerative surfing boats will also be controllable in pitch and roll control.

The vertical sculling hydrofoil boat (16) shown in FIG. 3 may be controllable on five axis—yaw, surge, heave, roll, and pitch—by exercising the four degrees of motion freedom and two degrees of damping freedom associated with the complex articulation of the vertical sculling drive, with its multiple suspension system elements and associated actuators, springs and generators. When combined with the additional yawing and pitching degrees of freedom associated with the canard foil (18), and the mass control possible with the ballast system, the vertical sculling hydrofoil boat (16) should be sufficient controllable for operation in a wide variety of conditions.

The vertical sculling hydrofoil shown in FIG. 3 utilizes a quasi-steady main foil pitch bias for altitude control, and quasi-steady main foil twist for roll control to eliminate the lift discontinuities associated with non-integrated roll control surfaces (10). Synchronous pitch (21) and heave (22, 23) oscillations in the main foil produce thrust (13) and braking (14) control, and an asymmetric main foil pitch and heave oscillations produce yaw control moments (12). The canard foil (18) may also be used for heave altitude and hull pitch (11) stabilization, and the canard foil strut (9) pivots about a near-vertical axis to provide an additional yaw control surface (12).

In one embodiment, a vertical sculling hydrofoil boat (16) with a high aspect ratio main foil (17) operated by a vertical sculling drive system (19) that serves as an integrated hydrodynamic propulsion and regenerative braking device (15) (FIG. 2). The main foil may be located just aft of the boat center of gravity, and carries nearly all weight of the boat during foil borne operation, which enables the use of an unusually small auxiliary canard foil (18) for excellent drag characteristics at surfing speeds.

The energy storage system (5) may be electrical. It uses a combination of batteries and super-capacitors as the storage elements, and power management electronics to control the flow of energy. Slowly-varying primary currents are provided by the batteries, and short term surge currents are handled by the super-capacitors.

The intelligence for surfing operation may be provided by an automated surfing control system (33) (FIGS. 4 and 5). This system may be comprised of a layered software architecture (34), numerous sensors (35), numerous controllers (36) and a digital computing infrastructure (37).

The sensor suite (35) preferably includes; an Inertial Navigation System (INS), a Global Positioning System (GPS), a magnetic compass (MC), depth and water speed sensors mounted on the main struts, and an optical or radar sea surface scanner.

Control may be provided by multi-layer surfing control software (34). The lowest layer of the software, the vehicle stabilization system (38), may be a reflexive autopilot that guides the boat trajectory in real time by issuing commands to the actuator controllers (36) in real time. The function of this lowest level of control is to provide a virtually stable vehicle for the upper layers of the surfing control software by implementing the real-time reflexes needed by the highly controllable, and therefore unstable, vertical sculling hydrofoil (16) hull form. The vehicle stabilization system exploits the high controllability to guide the boat through the unsteady wave and water conditions, allowing the higher control layers to believe they are on a stable, "not so twitchy" platform.

The middle of the multi-layer surfing control software (34) may be the surfing action generator (39). The surfing action generator may be also an autopilot, but a reflective autopilot focused on exploiting the immediate water conditions with appropriate actions; when to catch the wave, when it is time to change to another wave, and when the surfing becomes so poor that it may be more economical to drift and wait. The surfing action generator observes the near-field sea surface, identifies surfing opportunities, and issues directives to the lower-level reflexive autopilot for trajectory changes.

The top layer of the multi-layer regenerative surfing control system (34) may be the surfing path planner (40) that manages the overall surfing strategy. A mission control layer (not shown) exists above this layer and provides goals and objectives for the trajectory from a mission perspective, but it may be up to the surfing path planner (40) to weigh the need for mission responsiveness against the need for harvesting energy. The surfing path planner maintains a set of high level trajectory goals and constraints provided by external mission control elements (e.g., waypoint lists with time expectations, or bounded area of operation), and an internal model of the local environmental conditions (e.g., wave patterns, wind patterns, bottom contours), and a performance model of the vertical sculling hydrofoil boat (16). The path planner (40) considers all of these inputs as it strategically formulates a trajectory or plan likely to satisfy both the needs of the mission control element and the need to harvest energy.

The surfing path planner (40) also interacts with the external world. The path planner seeks information from external sources on likely seas states in the areas of operation, water depths, prevailing wind directions, currents, and other pertinent bits of information. and develops a local path that optimizes surfing power within the mission control system's established goals and constraints. The path planner also provides reports and estimates on the current regenerative surfing conditions so the mission planner will be able to set mobility goals and constraints intelligently.

Each of the three software layers in the automated surfing control system (33) have leeway in guiding the regenerative surfing boat, which means that the course and speed of the boat may vary widely as the regenerative surfing control system opportunistically collects power. Where the external mission control system determines that there is little slack in the the route the boat must follow, (for example, when transiting a crowded harbor), the automated surfing control system switches over to conventional autopilot automation.

Propulsion and braking may be provided by a vertical sculling motion that includes a vertical oscillation of the main foil (17) and a synchronized pitch oscillation (FIG. 4). The sculling motion may be provided by actuators that vertically flap the main strut (27) support arms (FIG. 4). In this diagram the upper support arm (28) provides the sculling motion and the lower support arm (29) provides stabilization. A vertical sculling drive controller (25) may control the vertical sculling motion.

The main foil pitch may be controlled by foil pitch actuators (21) via control linkages contained in the support arms (28,29) and the main struts (27). The foil pitch actuators (21) on the port and starboard are independent to enable asynchronous actuation of the actuators to effect a twist in the main foil. Synchronous actuation of the two foil pitch actuators creates a bias in the incidence of the main foil, and thereby changes the altitude that the main rides in the water. Biasing spring (24) may offset the bias. Takeoff and landing are effected by commanding this symmetric lift bias.

In propulsion mode, the vertical oscillations of the main foil are powered by the vertical sculling actuator/generators (26) to produce thrust. When the amplitude of the pitch oscillation is small compared to the amplitude of the heave oscillations the lift of the foil may be rotated forward, producing a net thrust (FIG. 4). If the pitch amplitude and frequency are well matched then this propulsion mode can be quite efficient.

In regenerative braking mode the pitch of the main foil (17) is cycled with large amplitudes by the foil pitch actuators (21). The resulting strong variations in angle of attack produce strong alternations in lift of the foil. The cyclic lift variation induces a bouncy oscillation in the vertical sculling suspension system (20), as well as a net braking effect since the large foil pitch excursions result in a backward rotation of the lift vectors. The heave bouncing may be damped by the actuator/generators (26) operating in generation mode. The collected energy is sent to the energy storage system (5). Energy harvesting may be maximized when the foil is oscillated in pitch near the damped heave resonant frequency of the vertical sculling hydrofoil boat (16).

Since vertical sculling introduces no additional appendages (such as propellers, hubs, shafts or pylons), the coasting drag of a vertical sculling hydrofoil boat (16) may be lower than the drag of any conventionally propelled hydrofoil. The thrust and braking performance of a vertical sculling powered boat are also extremely good at low speeds, since the heaving main foil (17) sweeps a much larger area than any conventional propeller or water-jet driven system. The combination of excellent drag characteristics, high low-speed thrust, and efficient propulsion and braking make the vertical sculling propulsor ideal for regenerative surfing applications.

A small canard foil may be attached on a pivot at the bottom of a strut at the front of the boat. The canard foil pivots in response to immersion due to the effect of pivoting foil and ski assembly in the front of the boat provides passive pitch and active yaw control (FIG. 6). This system has been proven to work on other small, high efficiency hydrofoils. Increasing the immersion of the Canard/Ski assembly while at speed causes the ski to produce more lift, which in turn causes the assembly to pitch up, increasing the angle of attack of the canard foil and increasing the lift. Likewise, decreasing the immersion of the canard/ski assembly at speed causes the assembly to pitch down and reduce the lift.

These two effects create a more-or-less stable fixed immersion point for the canard/ski system that stabilizes the entire boat in pitch and heave. When the boat slows the main foil loses lift and sinks a little deeper into the water, which increases its angle of attack and restores the lost lift. Similarly, when the boat moves faster the main foil lift may be increased so the foil rises and reduces its angle of attack. The boat may be trimmed in heave and pitch by adding a symmetric bias to the main foil pitch actuators.

Yaw control may be provided by a combination of steering with the canard foil and differential thrust and braking by sculling the main foil asymmetrically. High agility, coordinated turns are possible with this approach.

A water ballast system (32) may be fitted to change speed at which the best L/D (lift to drag ratio) occurs. The water ballast system (32) scoops water into ballast tanks 30 of the boat to increase weight for fast surfing conditions, and allows water to drain out for slow surfing conditions using scoops and dump doors (31). Baffles and multiple chambers in the system reduce the unstable effects of sloshing. This system may be used infrequently, in the same way that sailors reef sails for increasing wind conditions.

Operation

The process of regenerative surfing is the same regardless of the method of construction. There are three basic techniques:

Open Water Technique

This technique may be suitable for open water waves that are either being created by the wind, or are residual swell from a distant storm. Actual sea conditions are rarely the same as these standard statistical models due to reflection, refraction and shoaling from shore and bottom features, differences in the wind production timing and direction, and inclusion of other wave events such as ship wakes.

Step 1. Wait for a Good Surfing Wave

A good surfing wave may be one that may be both steep and tall, and likely to pass nearby the boat. A wave that is steeper than the inverse of the lift to drag ratio at the wave speed is the minimum criteria for a good wave. Good surfing waves appear infrequently in open water conditions with low winds and tired seas, and frequently in areas where the winds are strong and the seas are building, so the duration of this wait is highly variable. However, trying to catch a wave that cannot at least replace the energy used to catch it is a net power loss, so the waiting period may be essential.

Step 2. Position Craft to Catch the Wave

This step involves maneuvering the craft until it is in front of the wave and oriented in the direction of the wave motion. If the boat is initially stationary then it must accelerate to maneuver into position. Once it is up to a good maneuvering speed, or if it is already at speed, it must maneuver until it is just in front of the wave and moving slightly slower than the wave. If the boat is already in the path of the wave then it only needs to orient itself properly and accelerate at the right time.

Step 3. Catch the Wave

This step involves timing the acceleration of the craft so that it reaches wave speed when it may be on the middle of the wave face. Alternately, if the craft is behind the wave and traveling faster than the wave it can cross over the crest of the wave and decelerate to match speed. Regardless of the path take, the wave may be caught when the craft is in position on the face and moving at wave speed, or traversing the face with a speed of advance in the direction of the wave equal to the wave speed. In general, steps 2 and 3 are performed as one smooth combined maneuver to minimize propulsion and drag losses.

Step 4. Extract Power by Regenerative Surfing

Once in position and surfing, if the drag of the boat is less than the sliding force due to gravity then regenerative braking may be used to control position and extract power. The braking force must be just enough to prevent the craft from slipping down the face of the wave into the trough, but not enough to cause the boat to slow so much that it may be passed by the wave. The goal is to maintain position and speed on the steepest part of the wave. During this phase the craft may occasionally need to apply thrust to move forward, or make lateral traverses to find better places on the wave for surfing. It can be shown that power collection can be increased if the boat is ballasted heavily and travels on a traversing path at its best L/D speed. The regenerative surfing phase lasts as long as the wave is large and steep.

Step 5. Maneuver to Catch the Following Wave

Large ocean waves travel in groups. Wave crests form at the back of the group and move forward in the group until the reach the front and eventually dissipate. Each individual crest persists for only a few seconds, but since new ones are always forming at the back of the group the regenerative surfing craft can continue to collect power by chain surfing.

The best maneuvering strategy for regenerative surfing begins with a rapid 90 to 180 degree turn as the wave begins to diminish, a back-surfing phase where the boat falls down the back side of the wave (using regenerative braking may be possible for additional power gain), then a turn to regain the original course in the trough behind the wave, followed by steps 3 and 4. This maneuver can also be accomplished by increasing the braking force to slow the craft, waiting until the wave passes underneath, then using the stored power to accelerate and catch the following wave. The optimal maneuver may be probably a hybrid of the two approaches.

Step 6. If the Following Wave is Not Suitable, Brake to a Stop and Repeat Starting at Step 1

Ocean wave groups change over time. They can pass through other groups, merge with other groups, spread and dissipate, or simply die out. The regenerative surfer must continuously make judgments on the suitability of the waves in the group for power collection. If they become too flat then abandoning the group may be the best power collection strategy. If the group begins to move faster than the optimal L/D speed then if possible the craft can take on more ballast, but after a point there may be no more room for additional water and the group may need to be abandoned. Likewise, if the group begins to move significantly slower than the typical group in the Sea then it may be prudent to stop and wait for a faster group rather than drop ballast to match that particular set.

Shoaling Water Technique

In shoaling water the wave speeds slow, the wavelengths decrease, and the wave heights increase. Shoaling also tends to disrupt the process of wave formation in groups. Wave crests that exist at the beginning of the shoaling process tend to persist longer, so it becomes possible to surf for longer periods of time. Also, the steeper wave slopes make the tactic of turning to glide parallel to the crest less desirable, since leaving a productive wave to coast for the next one loses power.

Therefore, in shoaling water, the best technique may be to exploit the currents and bottom features that create the shoaling. Board surfers use these techniques in the surf zone. The low drag of the hydrofoil enables it to exploit these same techniques in shoaling water away from the beach.

Step 1. Reconnaissance

The craft should explore the shoaling area to develop a surfing route that maximizes surfing where the waves are the most intense, and uses areas with rip currents or calm sections for the return segment. Good places for surfing include areas where the water depth gradually decreases along the wave route, areas where refraction and reflection create constructive interference, and places open to the oncoming sea waves. Good places for return trips include rip tides, calm areas behind obstructions such as seawalls, areas where the refraction and reflection create destructive interference, and areas where the water depth increases along the wave path.

Ideally, the circuit will take advantage of bent wave paths due to refraction to maximize surfing distance and minimize the recovery distance. In the extreme, the craft may take advantage of the fact that open water waves always bend to approach the shore and make a complete circuit of the shoreline of an enclosed sea. In general the circuit will have one or more surfing legs and one or more recovery legs.

Step 2. Maneuver to the Beginning of a Surfing Leg and Begin Surfing

This phase follows a process identical to steps 1–4 in open water surfing. First a good surfing wave is selected, then the craft maneuvers for position and catches the wave, and finally power is collected by regenerative braking while surfing the wave. The surfing wave is kept for longer periods of time. The decision to abandon the wave may be because the wave is about to break, or that the craft is getting too close to shore, or that the craft is passing an ideal spot for beginning the next return leg.

Step 3. Recover to the Start of the Next Surfing Leg

The return leg may be done in either hull borne or foil borne mode. If the wind and current are favorable it may be usually best to do the recovery leg in hull borne mode to conserve power. Strong rip currents are especially favorable for hull borne operation. Where the wind or currents are unfavorable it may be best to minimize the time on the recovery leg by continuing with foil borne operation. The goal is to minimize the amount of power than must be expended to get to the next surfing leg.

Step 4. Return to Step 3 and Begin Surfing

This inner loop of steps 2 to 4—catch a wave, surf, exit the wave, recover to a good place to catch the next wave, etc.—may be repeated until the circuit is finished. Generally in a good surf zone there may only be one surf leg and one recovery leg for each circuit (as is the practice for board surfers at the beach), but there may be many steps if the mission profile traverses the beach, or if the surfing environment is complex (as in the wave patterns in a complex island system).

Step 5. At the End of the Circuit, Reflect and Repeat at step 1

This is the time for the craft to reflect on what was good about the circuit, where it made substantial power, where it didn't, and areas where the recovery phase was difficult. Changing the surfing and recovery lines, or even rethinking the entire plan, may be anticipated to be an important activity for improving power collection.

River Wave Technique

The primary difference between river waves in rapids and ocean waves is that river waves are virtually constant. Also river waves exist in a spatially varying current field that can pose problems with navigation. Generally the water depth may be shallow so collision with the bottom may be a significant risk. The steps generally follow the process of shoaling water surfing.

Step 1. Reconnaissance

Planning a circuit in a river may be both easier and harder than in shoaling water. The rocks, embankments, currents and waves in a river are virtually stationary, enabling a GPS-based surfing path to be defined and executed. However, sensors such as forward scan sonar that can penetrate some distance in shoaling water are difficult to employ in typical rapids due to the numerous obstacles and current shear layers. And optical means of sensing are limited because the elevation of the camera may not provide a clear view. Therefore river wave surfing may be likely to be a far-future undertaking.

Although a loop with multiple waves, currents and eddies may be possible, it will probably be simplest to concentrate on the first wave in a major constriction in the river. These first waves are usually the most stable and most powerful of the entire rapids, and are generally flanked with eddies or other potential approach paths.

Step 2. Maneuver for Position

As with river kayakers, the boat must use favorable currents and waves to achieve this goal. The most favorable position may be stationary in an eddy to the side of the wave to be surfed. Where this is not possible, an approach from downstream will be best as it reduces the relative velocity between the boat and the wave.

Step 3. Catch the Wave

This step may be quite different from catching an ocean wave. If the boat is in an eddy to the side of the wave it must cross the shear line at the edge of the eddy and begin surfing on the face of the wave. This may be generally a low-energy maneuver, as the face of the wave may be typically even with or below the eddy. If the boat is approaching from downstream then it must use a burst of thrust to pass over the crest of the wave, then a sudden braking to avoid overshooting the face.

Step 4. Surf the Wave and Collect Power

River waves are seldom as smooth and calm as ocean waves. Large scale turbulence from disturbances upstream of the wave create rapid changes in the slope, speed, direction and altitude of the current on the wave face. Small, rapid corrections are needed to remain in a good position. Fortunately, the inertial navigation system and GPS system need only maintain average position. Care must be taken to never slide deep into the trough to avoid hitting the rock or ledge which may be creating the wave. This may be where good reconnaissance pays off, as surfing a deep water wave created by a constriction is always safer than surfing a shallow one created by a rock or ledge.

Step 5. Dismounting the Wave

Unlike ocean waves, river waves never end. The dismount can be done either to the upstream side (if the current is deep and there are no obstructions), to the side (if there are eddies or pools to the side) or downstream. The downstream dismount may be the easiest and most reliable. Simply execute a 90 degree turn and the craft will be carried downstream with the current. Once past the wave go hull borne and drift to a safe spot.

Dismounting to the side may be the same, however instead of going hull borne the craft remains foil borne and turns slightly upstream and ferries into the eddy. Dismounting upstream requires only a surge of thrust, however the possibility of collision with the bottom may be present in most rivers.

Ship Wake Technique

It may be sometimes possible to surf the wakes of displacement ships and some planing craft. The necessary conditions for surfing are that the ship or boat speed is near the optimum L/D speed for the surfing craft, that it may be producing waves steep enough to surf, and that the seas are calm enough to not substantially disrupt the wake.

The process of regenerative surfing ship wakes may be similar to river wave surfing, but the frame of reference is the ship instead of the river bottom. Good reconnaissance and quick reflexes are the keys to success.

Slender, high speed ships with low prismatic coefficients, such as frigates and destroyers, are difficult to surf successfully. The best surfing wake is usually found near the transom of the ship, just to the side of the boundary layer foam. The bow waves are usually very slender and difficult to surf. Some military ships with large sonar domes produce a good surfing slope near the bow, though capsize in this area may be dangerous. Collision with the sharp stem of a destroyer will certainly create substantial damage.

Deep ships with high prismatic coefficients, such as tankers, generally travel at very low Froude numbers and therefore produce many relatively small waves with shallow slopes. However, the sheer size of these vessels means that even these "relatively small" waves contain huge amounts of energy. If the ship has a rounded bow then the high pressure zone at the very front of the ship creates a hill that can be surfed. Care must be taken to keep far enough away from the bow to maintain water speed. (Capsize in front of these behemoths may be less dangerous than capsize in front of a destroyer, as the rounded bow of a tanker will tend to push the surfing boat aside.) It may also be possible to surf the transverse wave behind the ship, though the water in this part of the wake may be full of powerful turbulence from the ship propulsor and the viscous drag of the ship hull.

Planing hulls operated near their hull speed offer the best potential for wake surfing. The flat, wide bottoms are optimized for lift above hull speed. At hull speed they generate a tremendous wake. The best surfing may be found in the first one or two Kelvin waves near the stem.

This patent application describes a new method of energy harvesting on water waves. Regenerative surfing requires a low drag, agile boat with a controllable hydrodynamic power generation device, an energy storage system, and a control system capable of executing complex surfing processes. A preferred construction has been described that meets these requirements. A regenerative surfing process has been described for each of the four main surfing environments.

What is claimed is:

1. A method whereby a regenerative surfing boat is able to extract energy from water waves by following a trajectory composed of a sequence of steps, including at least one regenerative surfing step, comprising:
   a) a plurality of wave capture steps;
   wherein the purpose of said wave capture step is for said regenerative surfing boat to efficiently start surfing on a wave whereby said boat is likely to collect power by regenerative surfing;
   wherein in said wave capture steps said regenerative surfing boat maneuvers itself onto the face of a wave likely to result in positive power collection;
   wherein in said wave capture steps said regenerative surfing boat accelerates or decelerates to approximately match the speed of said promising wave;
   wherein in said wave capture steps said regenerative surfing boat orients its path to follow in the general direction of said promising wave;
   wherein at the end of said wave capture step said regenerative surfing boat is surfing on said promising wave; that is, said boat is located on the face of said wave, said boat is traveling with said wave, and the force of gravity pulling said boat down the face of said wave is greater than the drag of said boat;
   b) a plurality of regenerative surfing steps,
   wherein said regenerative surfing steps are preceded by said wave capture steps;
   wherein the purpose of said regenerative surfing step is to maximally collect power by regenerative braking while being pulled down steep parts of the face of said wave;
   wherein during said regenerative surfing steps said regenerative surfing boat is able to occasionally extract power from said wave by regenerative braking, provided the drag of said boat without said regenerative braking is less than the product of the force of gravity times the sine of said wave's slope at the location of said boat;
   wherein during said regenerative surfing steps said boat may occasionally utilize propulsive thrust to accelerate forward onto steeper parts of the face of said wave;
   wherein during said regenerative surfing steps said boat may occasionally utilize turning maneuvers to move laterally onto steeper parts of said wave's face;
   wherein during said regenerative surfing steps said boat may occasionally apply braking forces to maneuver backward onto steeper parts of said wave's face;
   wherein during said regenerative surfing steps said boat may occasionally glide without applying any braking, turning or accelerating forces while waiting for steep sections of said wave's face to appear;
   wherein during said regenerative surfing steps said boat may simultaneously execute more than one of the above regenerative surfing techniques;
   c) a plurality of surfing dismount steps;
   wherein the purpose of said surfing dismount step is to terminate a regenerative surfing step;
   wherein during said surfing dismount steps said regenerative surfing boat is able to leave said wave face by applying a braking force until said wave passes ahead of said boat;
   wherein during said surfing dismount steps said regenerative surfing boat is able to leave said wave face with a turning maneuver that causes said boat to change direction such that it no longer travels with said wave;
   wherein during said surfing dismount steps said regenerative surfing boat is able to leave said wave face by accelerating down and off the front of said wave face;
   wherein during said surfing dismount steps said regenerative surfing boat is able to leave said wave by default, as said wave may diminish in strength until it can no longer support surfing;
   wherein during said surfing dismount steps said regenerative surfing boat is able to simultaneously execute more than one of the surfing dismount techniques described previously;
   d) a plurality of transit steps;
   wherein the purpose of said non-surfing transition steps is to repositioning said regenerative surfing boat in a timely manner to a good point on the surface of the water for initiating said wave capture step onto the next promising wave;
   wherein during said non-surfing transit steps said regenerative surfing boat is able to occasionally conserve energy by coasting without propulsion, as long as such coasting supports said transit goal;
   wherein during said not-surfing transit steps said regenerative surfing boat is able to apply propulsion thrust in order to achieve said transit goal;
   wherein during said non-surfing transit steps said regenerative surfing boat is able to change course in order to achieve said transit goal;
   wherein during said no-surfing transit steps said regenerative surfing boat is able to execute more than one transit technique, either sequentially or simultaneously, in order to achieve said transit goal;
   e) a plurality of drifting steps;
   wherein said drifting steps are preceded by either said transit steps or by said surfing dismount steps;
   wherein said drifting steps precede either said transit steps or said wave capture steps;
   wherein the purpose of said drifting steps is to conserve energy while conditions are not suitable for entering a wave capture step;
   wherein during said drifting steps said boat may utilize regenerative braking to convert the kinetic energy of said boat for future use;
   wherein during said drifting steps said boat may drifts at near zero speed without propulsion to conserve energy.

2. The regenerative surfing method of claim 1, wherein the regenerative surfing trajectory is intended to capture energy from a single traveling water wave, comprising:
   a) a transit step, if required, to position said boat for capturing said solo wave;
   b) a wave capture step onto said solo wave, wherein said boat applies propulsive thrust to accelerate to match the speed of said wave;
   c) a regenerative surfing step on said solo wave; and d) a surfing dismount step from said solo wave, wherein said dismount step is executed by aggressive regenerative braking to recover some of the kinetic energy put in to said boat during said capture phase.

3. The regenerative surfing method of claim 1, wherein the regenerative surfing trajectory is intended to capture energy from a traveling water wave group, comprising:
   a) a transit step, if required, to position said boat for capture of the largest wave in said wave group;
   b) an initial wave capture step onto largest waves of said wave group, wherein said boat is likely to utilize propulsive thrust to accelerate to match the speed of the largest wave in the wave group;
   c) a plurality of regenerative surfing steps on the largest waves of said wave group;
   d) a plurality of surfing dismount steps, initiated when said largest wave has moved to the front of the group and is about to fade, whereby said regenerative surfing boat executes said dismount by veering away from the direction of travel of said fading wave without significant thrust or braking;
   e) a plurality of transit steps, wherein said regenerative surfing boat waits by gliding along a path nearly perpendicular to the direction of travel of said wave group, until said following wave approaches the path of said waiting boat;
   f) a plurality of capture steps, whereby said regenerative surfing boat turns into said wave's direction of travel, and accelerates to match speed and position with said new largest wave, thereby initiating a new regenerative surfing step c;
   g) a final dismount step, initiated when said wave group is no longer a good source of power, wherein said regenerative surfing boat aggressively brakes to recover some of the kinetic energy of said boat.

4. The surfing method of claim 1, wherein the regenerative surfing trajectory consists of an ad-hoc sequence of steps to capture energy in chaotic wave conditions, comprising:
   a) a plurality of drifting steps while waiting for good surfing opportunities to appear;
   b) a plurality of wave capture steps when good surfing opportunities present themselves;
   c) a plurality of regenerative surfing steps, wherein said regenerative surfing boat may effectively transfer from one wave to another while still surfing as said waves cross underneath said boat;
   d) a plurality of transit steps;
   e) a plurality of surfing dismount steps.

5. The regenerative surfing method of claim 1, wherein the regenerative surfing method is adapted for collecting power from stationary waves caused by restrictions or obstructions to the flow of a current, comprising:
   a) a plurality of transit and drifting steps, that may be performed either in or out of the current depending on the requirements for approach, to enable said regenerative surfing boat to reach a good position for initiating a capture step;
   b) a plurality of wave capture steps, wherein said regenerative surfing boat comes to a stop over the face of the stationary wave;
   c) a plurality of regenerative surfing steps of indefinite duration,
   d) a plurality of unintentional dismount steps, wherein said regenerative surfing boat is ejected from the wave by turbulence in the current;
   e) an intentional surfing dismount step.

6. A regenerative surfing boat (1) that extracts energy from water waves by regenerative surfing, comprising:
   a) a propulsion system (2),
   wherein said propulsion system is capable of accelerating said boat to approximately the same speed as the wave that it intends to surf in capture steps;
   wherein said propulsion system is capable of providing thrust at surfing speeds to effect position changes while in regenerative surfing steps;
   b) a low drag hull form (3),
   wherein the drag of said hull form is less than the pull of gravity on the boat times the sine of the local wave slope during typical conditions in regenerative surfing phases;
   wherein said low drag hull form frequently requires a additional drag in the form of regenerative braking to maintain optimal surfing position during regenerative surfing steps;
   c) a controllable regenerative braking system (4),
   wherein said controllable regenerative braking system provides controllable drag for trajectory control during said regenerative surfing steps;
   wherein said controllable regenerative braking system is utilized to provide aggressive braking forces during said wave dismount steps and to initiate said drifting steps;
   wherein said controllable regenerative braking system extracts power from the water flowing past said regenerative surfing boat while braking;
   d) an energy storage system (5),
   wherein said energy storage system provides energy for said propulsion system (2);
   wherein said energy storage system is supplied by energy from said controllable regenerative braking system (4);
   d) a maneuvering control system (6),
   wherein said maneuvering control system (6) is able to consist of passive and active elements;
   wherein said passive elements of is able to be intrinsic properties of said low drag hull form (3), said propulsion system (2), or said controllable regenerative braking system (4);
   wherein said active elements may consist of lift producing hydrodynamic surfaces, drag producing hydrodynamic surfaces, the propulsion system (2), the controllable regenerative braking system (4), mass shifting devices, or gyroscopes;
   wherein said maneuvering control system is capable of commanding steady speeds for said regenerative surfing boat;
   wherein said maneuvering control system is capable of commanding sufficient acceleration to perform maneuvers required by the regenerative surfing method;
   wherein said maneuvering control system is capable of commanding sufficient deceleration to perform maneuvers required in the regenerative surfing method;
   wherein the yaw stability provided by said maneuvering control system enables said regenerative surfing boat to maintain course in seas;
   wherein the yaw control provided by said maneuvering control system is sufficient for performing the turning maneuvers required in the regenerative surfing method;
   wherein the roll stability provided by said maneuvering control system is sufficient to prevent roll over or other forms capsize during all steps of the regenerative surfing method;

wherein the roll control provided by said maneuvering control system is sufficient for perform the maneuvers required in the regenerative surfing method;

wherein the pitch stability provide by said maneuvering control system is sufficient for preventing pearling or other forms of capsize during all steps of the regenerative surfing method.

7. The regenerative surfing boat of claim 6, wherein the hydrodynamic elements of the controllable regenerative braking system (4) are comprised of one or more of the following devices:

a free turbine, consisting of one or more rotating hydrodynamic surfaces rotating about an axis aligned with the fluid motion;

a ducted turbine, consisting of a hydrodynamic inlet and a nozzle exit connected by a way of a duct, with a hydrodynamic turbine rotating within the duct about an axis aligned with the centerline of the duct;

a paddle-wheel with hydrodynamic surfaces that rotate about an axis perpendicular to the direction of travel, with only the lower surfaces in contact with the water;

an oscillating hydrodynamic surface that operates with a symmetric sculling or swimming motion similar to a fish tail;

an oscillating hydrodynamic surface that operates with an asymmetric sculling motion, as in a gondola oar or penguin wing;

an oscillating hydrodynamic surface that operates with a rowing motion, as in a row boat oar;

an oscillating hydrodynamic surface that operates with a combination of symmetric and asymmetric sculling and rowing motions, such as a canoe or kayak paddle;

a drag producing device such as a parachute or roughened conveyer belt that is pulled by the water flow backwards;

a hydrodynamic scoop that shunts water to either an elevated or pressurized cavity within the boat;

a resonant cavity that is excited by the water flow to produce acoustic energy, as with a whistle or flute; or a magneto-hydrodynamic generator.

8. The regenerative surfing boat of claim 7, wherein the low drag hull form (3) is a hydrofoil hull form with separate propulsion and braking devices, comprising:

a) one or more buoyant hulls (7), wherein said buoyant hulls are partially submerged at low speeds and at rest;

wherein said buoyant hulls provide buoyant lift at low speeds and at rest;

wherein said buoyant hulls provide pitch and roll stability at low speeds and at rest;

wherein said buoyant hulls provide some of the dynamic lift during the takeoff and landing maneuvers;

wherein said buoyant hulls house and protect the majority of the power, energy, control, payload and auxiliary systems of said hydrofoil boat;

b) one or more wing-like hydrofoils (8), wherein said hydrofoils provide dynamic lift;

wherein said hydrofoils provide sufficient dynamic lift at speeds above the minimum foil-borne speed to raise the buoyant hull or hulls (7) completely out of the water for reduced drag;

wherein said hydrofoils are designed for low drag at surfing speeds;

c) a system of low-drag struts (9), wherein said low drag struts connect said hydrofoils (8) to said buoyant hulls (7);

wherein said low drag struts are designed for low drag at surfing speeds;

d) a plurality of roll control surfaces (10);

wherein said roll control surfaces provide active roll control;

wherein said roll control surfaces are operated by said maneuvering control system (6);

e) one or more pitch control surfaces (11);

wherein said pitch control surfaces provide both passive and active pitch control;

wherein said pitch control surfaces are operated by said maneuvering control system (6);

f) one or more yaw control surfaces (12);

wherein said yaw control surfaces provide both passive and active yaw control;

wherein said yaw control surfaces are operated by said maneuvering control system (6);

g) one or more hydrodynamic propulsion devices (13)

wherein said hydrodynamic propulsion device (13) is part of said propulsion system (2);

said hydrodynamic propulsion device provides thrust for said regenerative surfing boat;

wherein said hydrodynamic propulsion device is able to be a water jet, ducted propeller, free propeller or an oscillating hydrodynamic surface;

h) one or more controllable hydrodynamic regenerative braking devices (14), wherein said controllable hydrodynamic regenerative braking device (14) is part of said controllable regenerative braking system;

wherein said controllable hydrodynamic regenerative braking device (14) provides hydrodynamic braking forces and collects power for said regenerative surfing boat;

wherein said controllable hydrodynamic regenerative braking device (14) may be a water turbine in a duct, a ducted propeller, a free propeller or an oscillating hydrodynamic surface.

9. The regenerative surfing boat (1) of claim 6, wherein the hydrodynamic elements of the controllable regenerative braking system (4) and the hydrodynamic elements of the propulsion system (2) are the same system elements, comprising one or more of the following integrated hydrodynamic propulsion and controllable regenerative braking devices (15):

a free propeller/turbine combination, consisting of one or more rotating hydrodynamic surfaces rotating about an axis aligned with the fluid motion, that is sufficiently controllable in pitch or rotational speed to enable said propeller to operate as both a power producing free turbine and a power consuming free propeller;

a ducted propeller/turbine combination; consisting of one or more rotating hydrodynamic surfaces rotating concentrically within a hydrodynamic duct aligned with the fluid motion, that is sufficiently controllable in pitch or rotational speed to enable said propeller to operate as both a power producing ducted turbine and a power consuming ducted propeller;

a paddle-wheel with hydrodynamic surfaces that rotate about an axis perpendicular to the direction of travel, with only the lower surfaces in contact with the water, that either applies thrust or braking depending on the relative speed of rotation with respect to the water speed of said regenerative surfing boat;

an oscillating hydrodynamic surface that operates with a symmetric sculling or swimming motion similar to a fish tail;

an oscillating hydrodynamic surface that operates with an asymmetric sculling motion, as in a gondola oar or penguin wing;

an oscillating hydrodynamic surface that operates with a rowing motion, as in a row boat oar;

an oscillating hydrodynamic surface that operates with a combination of symmetric and asymmetric sculling and rowing motions, such as a canoe or kayak paddle;

a hydrodynamic scoop that shunts water to either an elevated or pressurized cavity within the boat, then releases said water at a later time to provide thrust via a rearward facing nozzle; or a magnetohydrodynamic device that operates in both propulsive and generative modes.

10. The regenerative surfing boat of claim 9, wherein the low drag hull form (3) is a hydrofoil hull form with integrated propulsion and braking devices, comprising:

a) one or more buoyant hulls (7), wherein said buoyant hulls are partially submerged at low speeds and at rest;

wherein said buoyant hulls provide buoyant lift at low speeds and at rest;

wherein said buoyant hulls provide pitch and roll stability at low speeds and at rest;

wherein said buoyant hulls provide some of the dynamic lift during the takeoff and landing maneuvers;

wherein said buoyant hulls house and protect the majority of the power, energy, control, payload and auxiliary systems of said hydrofoil boat;

b) one or more wing-like hydrofoils (8), wherein said hydrofoils provide dynamic lift;

wherein said hydrofoils provide sufficient dynamic lift at speeds above the minimum foil-borne speed to raise the buoyant hull or hulls (7) completely out of the water for reduced drag;

wherein said hydrofoils are designed for low drag at surfing speeds;

c) a system of low-drag struts (9), wherein said low drag struts connect said hydrofoils (8) to said buoyant hulls (7);

wherein said low drag struts are designed for low drag at surfing speeds;

d) a plurality of roll control surfaces (10);

wherein said roll control surfaces provide active roll control;

wherein said roll control surfaces are operated by said maneuvering control system (6);

e) one or more pitch control surfaces (11);

wherein said pitch control surfaces provide both passive and active pitch control;

wherein said pitch control surfaces are operated by said maneuvering control system (6);

f) one or more yaw control surfaces (12);

wherein said yaw control surfaces provide both passive and active yaw control;

wherein said yaw control surfaces are operated by said maneuvering control system (6);

g) one or more integrated hydrodynamic propulsion and regenerative braking devices (15)

wherein said integrated hydrodynamic propulsion and regenerative braking device (15) is part of said propulsion system (2);

wherein said integrated hydrodynamic propulsion and regenerative braking device (15) is part of said controllable regenerative braking (4);

wherein said integrated hydrodynamic propulsion and regenerative braking device (15) provides thrust for said regenerative surfing boat (1);

wherein said integrated hydrodynamic propulsion and controllable regenerative braking device (15) provides hydrodynamic braking forces and collects power for said regenerative surfing boat (1);

wherein said integrated hydrodynamic propulsion and regenerative braking device (15) may be any of the integrated hydrodynamic propulsion and regenerative braking devices described in claim 9.

11. The regenerative surfing boat of claim 10; wherein said hydrofoil boat is a vertical sculling hydrofoil boat (16), comprising:

a) a vertical sculling main foil (17);

wherein said vertical sculling main foil consists of a high aspect ratio wing-like surface oriented transverse to and well below the centerline axis of said regenerative surfing boat (1);

wherein said vertical sculling main foil (17) is located just aft of the vehicle center of gravity;

wherein said vertical sculling main foil (17) provides sufficient lift to carry the bulk of the weight of said regenerative surfing hydrofoil boat while foil-borne;

wherein said vertical sculling main foil (17) is driven up and down by motors within the hull to produce thrust;

wherein the incidence of said vertical sculling main foil (17) is actively controlled;

wherein said vertical sculling main foil (17) is driven up and down by the water flow when the incidence angle is actively cycled;

wherein said vertical sculling main foil (17) does work against the regenerative surfing boat (1) when driven up and down by the water flow;

wherein said vertical sculling main foil (17) is an integrated hydrodynamic propulsion and controllable regenerative braking device (15) of the oscillating hydrodynamic surface type, and is controlled by coordinating the heave and pitch actuators of the main foil;

wherein said vertical sculling main foil (17) provides all propulsive forces for the regenerative surfing boat (1);

wherein said vertical sculling main foil (17) provides all the controllable regenerative braking forces for the regenerative surfing boat (1);

wherein said vertical sculling main foil (17) houses the roll control surfaces (10);

b) a canard foil (18), wherein said canard foil (17) is a pitch control surface (11) that provides active or passive pitch stabilization;

wherein said canard foil (17) is a yaw control surface (12) that provides active yaw control.

12. A regenerative surfing boat (1) of claim 11, wherein the vertical sculling main foil (17) is the hydrodynamic part of a vertical sculling drive system (19), comprising:

a) a vertical sculling suspension system (20), comprising a plurality of struts, pivots, arms and spring that enables the vertical sculling main foil (17) to oscillate vertically with respect to the centerline axis of the regenerative surfing boat (1);

b) a plurality of foil pitch actuators (21) that actively controls the incidence of the main foil, or equivalently the incidence of a system of flaps on the main foil, with respect to the centerline axis of the regenerative surfing boat (1), in either an oscillatory manner for thrust or braking control, or in a biasing manner for steady lift control;

c) a plurality of main foil heave actuators (22) that drive the main foil up and down with respect to the main axis of the regenerative surfing boat (1) while said vertical sculling drive system is producing thrust;

d) a plurality of main foil heave generators (23) that collect power from the work done on said boat as said water flow drives said main foil up and down in response to oscillating foil or flap incidence changes;

e) a plurality of biasing springs (24) to offload the weight of the craft from the actuators and generators;

f) a vertical sculling drive controller (25) that synchronizes the motions of the pitch and heave actuators to provide the desired propulsive, braking and lift effects.

13. A regenerative surfing boat (1) of claim 11, wherein the vertical sculling main foil (17) is the hydrodynamic part of a vertical sculling drive system (19), comprising:

a) a vertical sculling suspension system (20), comprising a plurality of struts, pivots, arms and spring that enables the vertical sculling main foil (17) to oscillate vertically with respect to the centerline axis of the regenerative surfing boat (1);

b) a plurality of foil pitch actuators (21) that actively controls the incidence of the main foil, or equivalently the incidence of a system of flaps on the main foil, with respect to the centerline axis of the regenerative surfing boat (1), in either an oscillatory manner for thrust or braking control, or in a biasing manner for steady lift control;

c) a plurality of integrate foil heave actuator/generators (23);

wherein said integrated foil heave actuator/generators (23) act as actuators while said vertical sculling drive system (19) is producing thrust and drive the main foil up and down with respect to the main axis of the regenerative surfing boat (1)

wherein said integrated foil heave actuator/generators (23) act as generators when the vertical sculling drive system (19) is operating in regenerative braking mode and collect power from the work done on said boat as said water flow drives said main foil up and down in response to oscillating foil or flap incidence changes;

d) a plurality of biasing springs (24) to offload the weight of the craft from the actuators and generators;

e) a vertical sculling drive controller (25) that synchronizes the motions of the pitch and heave actuators to provide the desired propulsive, braking and lift effects.

14. A regenerative surfing boat (1) of claim 12, wherein the vertical sculling suspension system (20) comprises:

a) two main struts (27) that support the main foil, oriented vertically and mounted equidistantly from the centerline of the foil;

b) two upper suspension arms (28), one for each strut, comprising a beam that rocks about a bearing mounted at the top edge of the boat and oriented with the pivot axis parallel to the centerline of the boat, and is attached at the outer end to the top of a main strut (27) with another pivot mounted parallel to the longitudinal axis of the boat, and is attached at the inner end to the biasing spring (24) and to a foil heave actuator (22) and a foil heave generator (23);

c) two lower suspension arms (29), one for each main strut (27), consisting of a beam attached at the outer end part-way down the main strut (27) with a pivot parallel to the centerline of the boat, and at the other end attached just above the hull-borne waterline with another set of hinges parallel to the centerline of the boat.

15. A regenerative surfing boat of claim 6, wherein a water ballast system to alter the speed at which the best lift to drag ratio is achieved, comprising:

a) a plurality of ballast tanks (30) for storing water ballast;
wherein said ballast tanks are distributed in such a way that it is always possible to balance said water ballast about said regenerative surfing boat's center of gravity with a minimum of free surfaces;

b) a system of scoops and dump doors (31) to collect and discharge said ballast water;

c) a ballast management system (32), comprised of tank level sensors, pumps, pipes and valves to manage the ballast water quantity and center of gravity.

16. The regenerative surfing boat (1) of claims 6, wherein the maneuvering control system is an automated surfing control system (33) comprising:

a) a plurality of surfing control software modules (34);

b) a plurality of sensors (35);

wherein said sensors include an inertial navigation module that senses the speeds, accelerations, orientations and rates of the craft;

wherein said sensors include external sensors such as GPS, water speed sensors and a magnetic compass to determine the location, bearing, orientation and speed of said regenerative surfing boat (1);

a plurality of controllers that observe the craft status as provided by the inertial navigation module, as well as the power and actuator status from the energy management and vertical sculling control systems, so as to compute;

a plurality of control inputs for the various actuators, including the main foil heave actuators, the main foil pitch actuators, and the canard foil yaw and pitch actuators to control the path of the vehicles;

wherein said sensors measure the near-boat sea surface;

wherein said sensors observe the internal system of said boat, including the state of power collection, the status of the energy storage system, and the ballast mass, if any;

c) a plurality of controllers (36);

wherein said controllers control the propulsion motors;

wherein said controllers control the regenerative braking system;

wherein said controllers operate the various pitch, yaw and roll actuators;

wherein said controllers operate any additional auxiliary systems.

d) a computing infrastructure (37), comprising computers, networks, storage devices and communications equipment sufficient to hosts said surfing control software, sensors and controllers.

17. The regenerative surfing boat of claim 16, wherein the surfing control software is organized into layers comprising:

a) a vehicle stabilization system (38);

wherein said vehicle stabilization system operates said controllers (36) to stabilize and control the regenerative surfing boat (1) in pitch, yaw, roll, heave, surge and sway;

wherein said vehicle stabilization system controls the propulsion (2) and controllable regenerative braking (4) systems;

wherein said vehicle stabilization system implements the near-term trajectory guidance provided by the surfing action generator (39);

b) a surfing action generator (39);

wherein said surfing action generator uses data from the sensors (35) to observe the near-vehicle sea surface, including the local water speeds and slopes on the face of said wave while surfing;

wherein said surfing action generator provides guidance to said vehicle stabilization system (38);

wherein said surfing action generator contains a path estimator capable of estimating the trajectory of the vehicle given a set guidance commands;

wherein said surfing action generator maintains path goals, and strives to have said regenerative surfing boat meet said goals with said guidance commands;

wherein said surfing action generator maintains path constraints, and strives to have said regenerative surfing boat not violate said constraints with said guidance commands;

estimating the near-future near-field speed and slopes of the wave, estimating the near-future path of the vehicle given the vehicle state and local expected conditions;

determining the best trajectory for power collection, and providing guidance to the vehicle stabilization and control system.

c) a surfing path planner (40);

wherein said surfing path planner observes the near, mid and far field sea surface;

wherein said surfing path planner maintains an internal model of the local environmental conditions, including the local depth profiles, prevailing winds, and surface wave states sufficient for predicting the next ten to thirty seconds of wave actions;

wherein said surfing path planner uses said internal environmental models to estimate the near future wave patterns;

wherein said surfing path planner uses performance models of said regenerative surfing boat (1) to estimate power given a trajectory over said near future wave pattern estimates;

wherein said surfing path planner exercises a search algorithm in a timely manner to find optimal or near optimal regenerative surfing route given said estimated power profiles over said expected near-future wave patterns;

wherein said surfing path planner from time to time provides updated path goals and constraints to said surfing action generator;

wherein said surfing path planner maintains a set of routing goals provided by an external source to give said regenerative surfing boat purpose;

wherein said surfing path planner maintains a set of routing constraints provided by an external source to prevent said regenerative surfing boat from violating motion constraints such as political boundaries or other zones of exclusion.

18. The regenerative surfing boat (1) of claim 13, wherein the vertical sculling suspension system (20) comprises;

a) two main struts (27) that support the main foil, oriented vertically and mounted equidistantly from the centerline of the foil;

b) two upper suspension arms (28), one for each strut, comprising a beam that rocks about a bearing mounted at the top edge of the boat and oriented with the pivot axis parallel to the centerline of the boat, and is attached at the outer end to the top of a main strut (27) with another pivot mounted parallel to the longitudinal axis of the boat, and is attached at the inner end to the biasing spring (24) and to an integrated foil heave actuator/generator (26);

c) two lower suspension arms (29), one for each main strut (27), consisting of a beam attached at the outer end part-way down the main strut (27) with a pivot parallel to the centerline of the boat, and at the other end attached just above the hull-borne waterline with another set of hinges parallel to the centerline of the boat.

* * * * *